(12) United States Patent
Lee et al.

(10) Patent No.: US 10,292,189 B2
(45) Date of Patent: May 14, 2019

(54) METHOD OF NETWORK CONFIGURATION FOR WIRELESS ACCESS POINT

(71) Applicant: MEDIATEK INC., Hsin-Chu (TW)

(72) Inventors: Hsueh-Chen Lee, Hsinchu County (TW); Pohsun Yang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/592,177

(22) Filed: May 10, 2017

(65) Prior Publication Data

US 2017/0339728 A1 Nov. 23, 2017

Related U.S. Application Data (60) Provisional application No. 62/337,841, filed on May 17, 2016.

(51) Int. Cl.
| | |
|---|---|
| *H04W 76/11* | (2018.01) |
| *H04W 12/04* | (2009.01) |
| *H04W 12/06* | (2009.01) |
| *H04W 48/16* | (2009.01) |
| *H04L 29/06* | (2006.01) |
| *H04W 12/10* | (2009.01) |
| *H04W 24/02* | (2009.01) |
| *H04W 84/12* | (2009.01) |
| *H04W 92/20* | (2009.01) |

(52) U.S. Cl.
CPC .......... *H04W 76/11* (2018.02); *H04L 63/061* (2013.01); *H04L 63/0876* (2013.01); *H04L 63/123* (2013.01); *H04W 12/04* (2013.01); *H04W 12/06* (2013.01); *H04W 12/10* (2013.01); *H04W 24/02* (2013.01); *H04W 48/16* (2013.01); *H04W 84/12* (2013.01); *H04W 92/20* (2013.01)

(58) Field of Classification Search
CPC . H04L 63/061; H04L 63/0876; H04L 63/123; H04W 76/11; H04W 12/04; H04W 12/06; H04W 12/10; H04W 24/02; H04W 48/16; H04W 84/12; H04W 92/20
See application file for complete search history.

(56) References Cited

U.S. PATENT DOCUMENTS

| | | | |
|---|---|---|---|
| 7,103,313 B2 | 9/2006 | Heinonen | |
| 7,292,870 B2 | 11/2007 | Heredia | |
| 8,339,991 B2 | 12/2012 | Biswas | |
| 8,893,246 B2 | 11/2014 | Jover Segura | |
| 2007/0189249 A1* | 8/2007 | Gurevich | H04L 45/20 370/338 |
| 2008/0198811 A1 | 8/2008 | Deshpande | |

(Continued)

FOREIGN PATENT DOCUMENTS

WO 2015/073519 A1 5/2015

*Primary Examiner* — Benjamin H Elliott, IV
(74) *Attorney, Agent, or Firm* — Winston Hsu (57) ABSTRACT

A method of network configuration for a first wireless access point (AP) includes scanning to find a second wireless AP; determining whether the first wireless AP is a network provider or a network joiner in a network connection with the second wireless AP according to a determination rule; establishing the network connection with the second wireless AP; and configuring a profile of the first wireless AP when the network connection is established; wherein the second wireless AP is configured to have a profile identical to the profile of the first wireless AP when the network connection is established.

26 Claims, 10 Drawing Sheets (56) References Cited

U.S. PATENT DOCUMENTS

| | | | |
|---|---|---|---|
| 2009/0129354 A1* | 5/2009 | Gupta | H04W 8/26 370/338 |
| 2011/0013569 A1 | 1/2011 | Scherzer | |
| 2011/0243033 A1* | 10/2011 | Won | H04W 48/20 370/254 |
| 2012/0177022 A1* | 7/2012 | Ichikawa | H04W 48/08 370/338 |
| 2014/0370875 A1* | 12/2014 | Gupta | H04W 8/26 455/418 |
| 2014/0378146 A1* | 12/2014 | Yavuz | H04W 52/367 455/438 |
| 2015/0281952 A1* | 10/2015 | Patil | H04W 12/04 713/168 |
| 2017/0230824 A1* | 8/2017 | Li | H04W 12/04 |
| 2017/0251362 A1* | 8/2017 | Zhang | H04W 92/20 |
| 2017/0339728 A1* | 11/2017 | Lee | H04L 63/061 |
| 2017/0359263 A1* | 12/2017 | Barghi | H04B 17/309 |

\* cited by examiner

METHOD OF NETWORK CONFIGURATION FOR WIRELESS ACCESS POINT

CROSS REFERENCE TO RELATED APPLICATIONS

This application claims the benefit of U.S. Provisional Application No. 62/337,841, filed on May 17, 2016, the contents of which are incorporated herein by reference.

BACKGROUND

The present invention relates to a method of network configuration for a wireless access point (AP), and more particularly, to a method of establishing and configuring a network connection of a group of wireless APs to establish wireless network coverage.

Wireless roaming is a well-known technology allowing a wireless communication device to switch between different wireless APs when the wireless communication device moves around in an area with multiple wireless APs. In order to enable the wireless roaming, the wireless APs should be configured with the same service set identifier (SSID), and the wireless APs should use the same profile and security configuration. The wireless communication device may automatically select one of the wireless APs with higher signal strength to connect. Since each of the wireless APs may have a limited coverage range, a building having a larger area and/or higher floors such as a department store or a townhouse is required to use multiple wireless APs disposed in different locations of the building to enhance the coverage range. Since these wireless APs have the same SSID, the wireless communication device may smoothly move to another wireless AP without disconnection.

In order to configure the profile (e.g., the SSID) of these wireless APs, the user may manually input related information to each of the wireless APs after the wireless AP boots up. For example, the user may connect a wireless AP to a computer, and input the information via the computer, in order to configure the profile. After the configuration of one wireless AP is completed, the user configures the next wireless AP, and so forth. This manual configuration process is inconvenient and time consuming, especially when the total number of wireless APs is large. Thus, there is a need for improvement over the prior art.

SUMMARY

It is therefore an objective of the present invention to provide a novel method of automatically configuring the wireless APs, in order to achieve an effective way of network configuration.

An embodiment of the present invention discloses a method of network configuration for a first wireless AP. The method comprises scanning to find a second wireless AP; determining whether the first wireless AP is a network provider or a network joiner in a network connection with the second wireless AP according to a determination rule; establishing the network connection with the second wireless AP; and configuring a profile of the first wireless AP when the network connection is established. The second wireless AP is configured to have a profile identical to the profile of the first wireless AP when the network connection is established.

An embodiment of the present invention further discloses a method of network configuration for a first wireless AP. The method comprises selecting to join a second wireless AP according to a selection rule; establishing a network connection with the second wireless AP; and configuring the first wireless AP to have a profile identical to a profile of the second wireless AP when the network connection is established.

These and other objectives of the present invention will no doubt become obvious to those of ordinary skill in the art after reading the following detailed description of the preferred embodiment that is illustrated in the various figures and drawings.

DETAILED DESCRIPTION

The present invention aims at providing a method of automatically configuring a group of wireless access points (APs), to establish wireless network coverage in a building. More specifically, when a user obtains a group of wireless APs and boots them up, this group of wireless APs may automatically connect to each other and negotiate to establish the wireless network coverage, where the user does not need to configure every wireless AP respectively. This saves the time and human activity required for configuring the wireless APs and thus achieves convenience.

Since the network provided by the group of wireless APs has to cover the entire building, it is preferable to spread the wireless APs across every area of the building, where each wireless AP needs to be connected to at least one of other wireless APs, i.e., the coverage range of each wireless AP should overlap the coverage range of at least one of other wireless APs. However, since the wireless AP may not be directly connected to all of the other wireless APs, several scenarios may be developed with different order of booting the wireless APs. The automatic configuration scheme for the wireless APs should be adaptive to every possible scenario.

Figure 1:
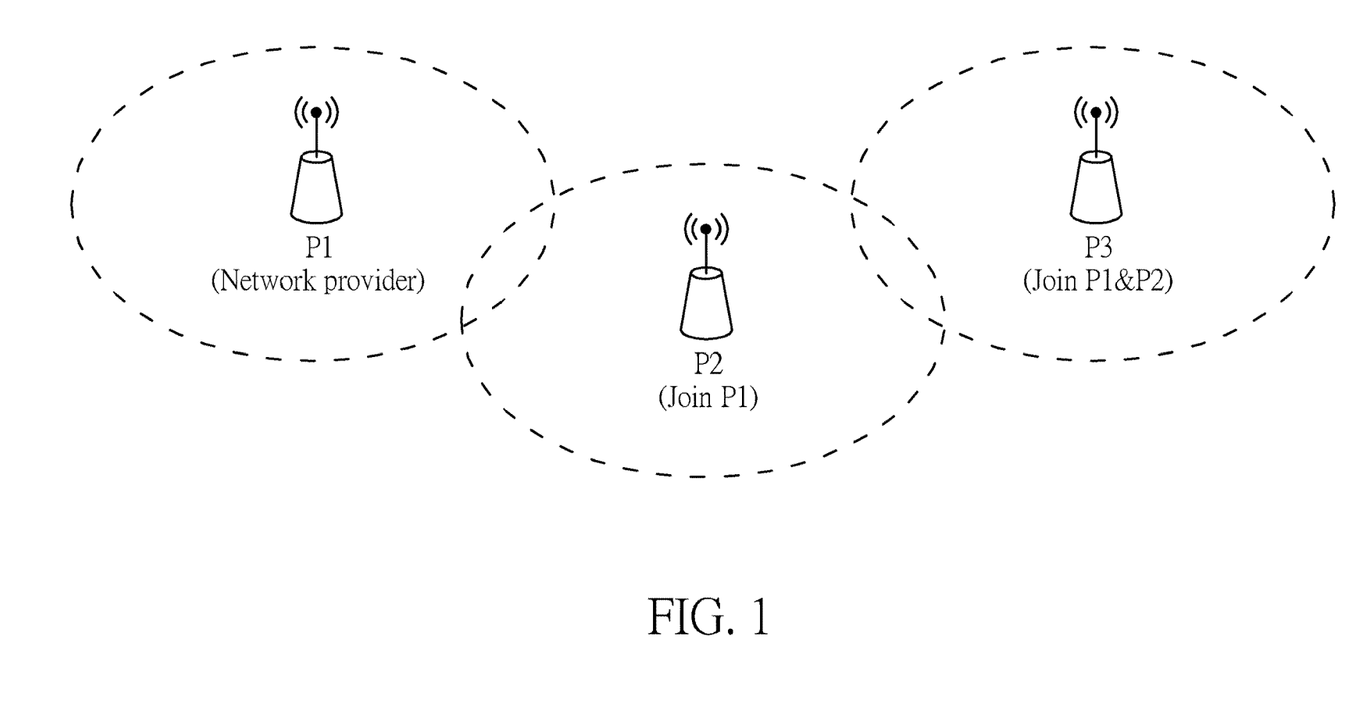
FIG. 1 to FIG. 5 are schematic diagrams of different scenarios of configuring the wireless access points.

FIG. 1 to FIG. 5 illustrate different scenarios of configuring the wireless APs. As shown in FIG. 1, the wireless APs P1 and P2 boot up first, and they are un-configured when they boot up. After the wireless APs P1 and P2 boot up, they may scan around and find the other one since their coverage ranges overlap. The wireless APs P1 and P2 may negotiate to establish a network connection and determine which one is the network provider and which one is the network joiner in this network connection according to a determination rule. The determination rule may include, but not limited to, comparison of the media access control (MAC) address, i.e., the basic service set identifier (BSSID). In such a situation, the wireless APs P1 and P2 may determine which one is the network provider and which one is the network joiner according to a comparison of the MAC address of the wireless AP P1 and the MAC address of the wireless AP P2. In this example, the MAC address of the wireless AP P1 is higher than the MAC address of the wireless AP P2; hence, the wireless AP P2 may act as the network joiner and join the wireless AP P1.

In an embodiment, the wireless APs P1 and P2 may determine which one is the network provider and which one is the network joiner according to whether the wireless AP P1 or P2 is already connected to an external network such as the Internet or other wide area network before the network connection is established. For example, if the wireless AP P1 is already connected to the Internet without via the network connection with the wireless AP P2 while the wireless AP P2 is not connected to the Internet, the wireless AP P1 may be determined to be the network provider and the wireless AP P2 may be determined to be the network joiner.

The wireless APs P1 and P2 may negotiate to configure their profiles and establish the network connection. The wireless AP P1 may be configured to have a profile identical to the profile of the wireless AP P2. The wireless AP P1, serving as the network provider, may configure the service set identifier (SSID) of the network connection. Therefore, a wireless communication device (e.g., a mobile phone or a portable device) is able to perform wireless roaming under the coverage areas of the wireless APs P1 and P2 with the established network connection.

Subsequently, after the profiles of the wireless APs P1 and P2 are configured, another wireless AP P3 boots up, and the coverage range of the wireless AP P3 overlaps with the coverage range of the wireless AP P2. The wireless AP P3 is un-configured when it boots up. The wireless APs P2 and P3 may scan around and find the other one since their coverage ranges overlap. Since the wireless AP P2 has been configured and the wireless AP P3 is un-configured, the wireless AP P2 may become a network provider and the wireless AP P3 may become a network joiner. In other words, the wireless AP P3 joins the network connection established by the wireless APs P1 and P2. The wireless AP P3 may negotiate with the wireless AP P2, so that the wireless AP P3 may configure its profile to be identical to the profile of the wireless AP P2; hence, the wireless AP P3 becomes configured after the negotiation. In such a situation, the wireless AP P3 extends the coverage range of the group of wireless APs after joining the network connection.

Figure 2:
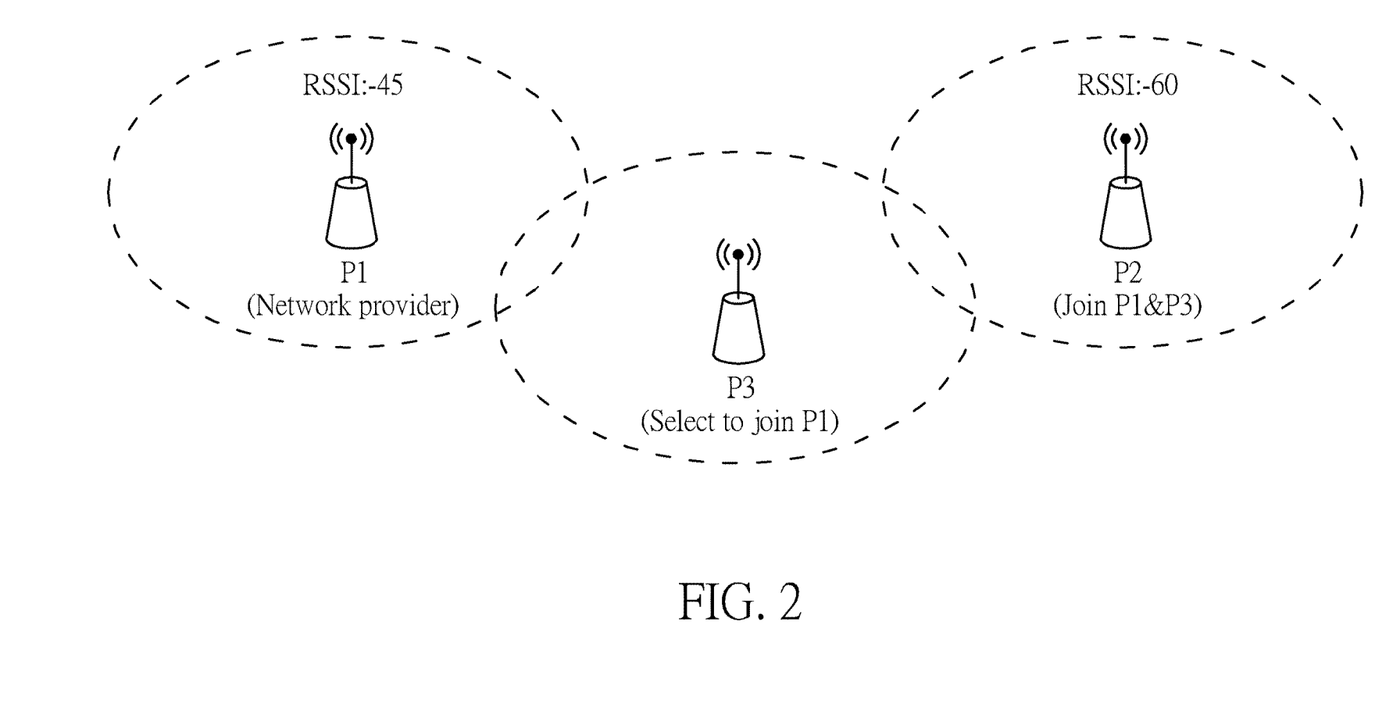

FIG. 2 illustrates another possible scenario. The wireless APs P1 and P2 boot up first, and they are un-configured when they boot up. After the wireless APs P1 and P2 boot up, they may scan around but cannot find any wireless AP in the vicinity since their coverage ranges do not overlap. Subsequently, another wireless AP P3 boots up. The coverage range of the wireless AP P3 overlaps the coverage range of the wireless AP P1 and also overlaps the coverage range of the wireless AP P2. In such a situation, the wireless AP P3 may select to join the wireless AP P1 or the wireless AP P2 according to a selection rule. The selection rule may include, but not limited to, comparison of the MAC address (i.e., the BSSID), comparison of signal strength and/or connection with an external network.

For example, the wireless AP P3 may receive a signal from the wireless AP P1 and also receive a signal from the wireless AP P2. The wireless AP P3 then compares the signal strength of the received signals. In this embodiment as shown in FIG. 2, the wireless AP P3 may measure the received signal strength indicator (RSSI) of the signals received from the wireless APs P1 and P2. The RSSI of the signals received from the wireless AP P1 is −45 dB, while the RSSI of the signals received from the wireless AP P2 is −60 dB; hence, the wireless AP P3 may select to join the wireless AP P1 since the RSSI corresponding to the wireless AP P1 is greater than the RSSI corresponding to the wireless AP P2. Therefore, the wireless AP P3 may negotiate with the wireless AP P1 to establish a network connection. The wireless APs P1 and P3 may configure their profiles to be identical.

Subsequently, the unselected wireless AP P2 may still be un-configured after the wireless APs P1 and P3 become configured; hence, the wireless AP P3 may become a network provider and the wireless AP P2 may become a network joiner. In other words, the wireless AP P2 joins the network connection established by the wireless APs P1 and P3. The wireless AP P2 may negotiate with the wireless AP P3, so that the wireless AP P2 may configure its profile to be identical to the profile of the wireless AP P3; hence, the wireless AP P2 becomes configured after the negotiation.

Figure 3:
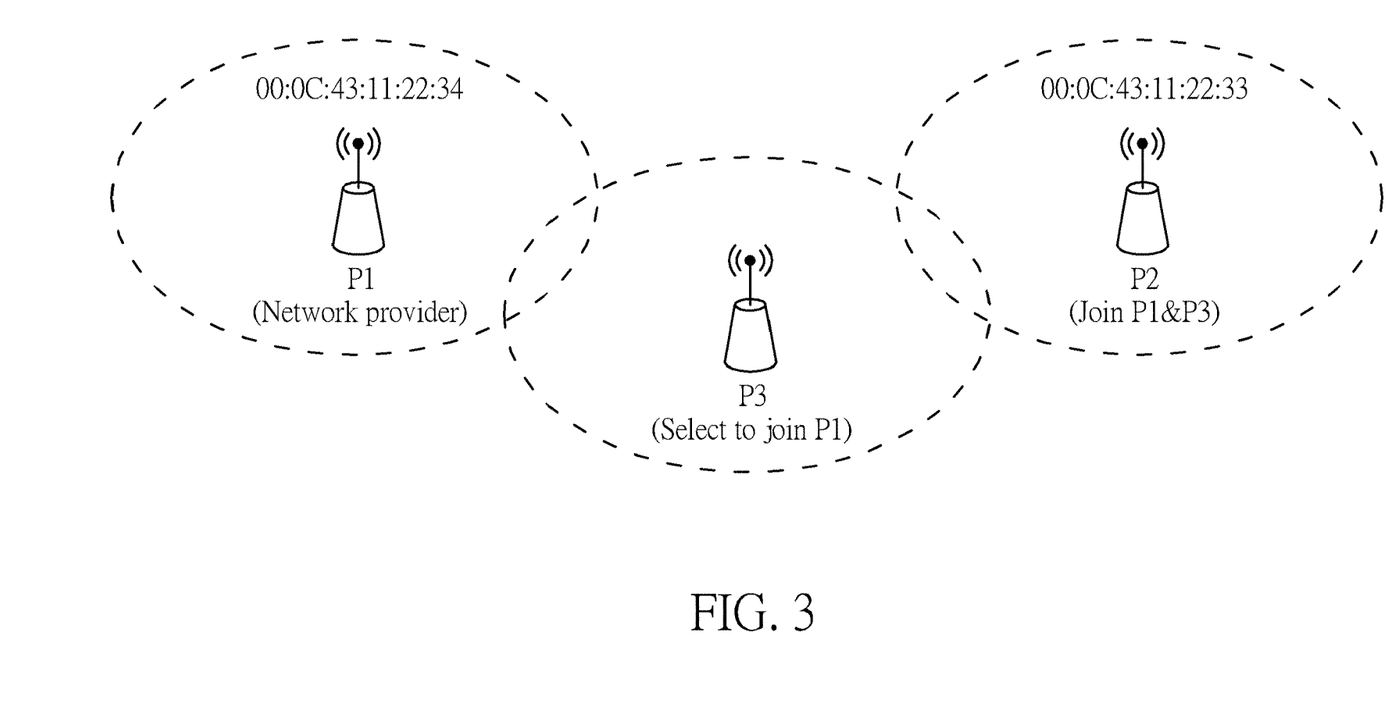

In another embodiment as shown in FIG. 3, the locations and coverage ranges of the wireless APs P1-P3 are similar to those shown in FIG. 2. In this embodiment, the wireless AP P3 selects to join the wireless AP P1 or P2 according to the MAC addresses of the wireless APs P1 and P2. In this embodiment, the MAC address of the wireless AP P1 is 00:0C:43:11:22:34, and the MAC address of the wireless AP P2 is 00:0C:43:11:22:33; hence, the wireless AP P3 may select to join the wireless AP P1 since the MAC address of the wireless AP P1 is higher than the MAC address of the wireless AP P2. Therefore, the wireless AP P3 may negotiate with the wireless AP P1 to establish a network connection. The wireless APs P1 and P3 may configure their profiles to be identical. Subsequently, the unselected wireless AP P2 may join the network connection established by the wireless APs P1 and P3. The detailed operations of the wireless AP P2 are similar to those shown in FIG. 2, and will not be narrated herein.

In a further embodiment, a wireless AP may select to join a wireless AP connected to an external network. For example, a first wireless AP may select between a second wireless AP and a third wireless AP, the first wireless AP may select to join the second wireless AP if the second wireless AP is already connected to the Internet without via the network connection with the first wireless AP.

Figure 4:
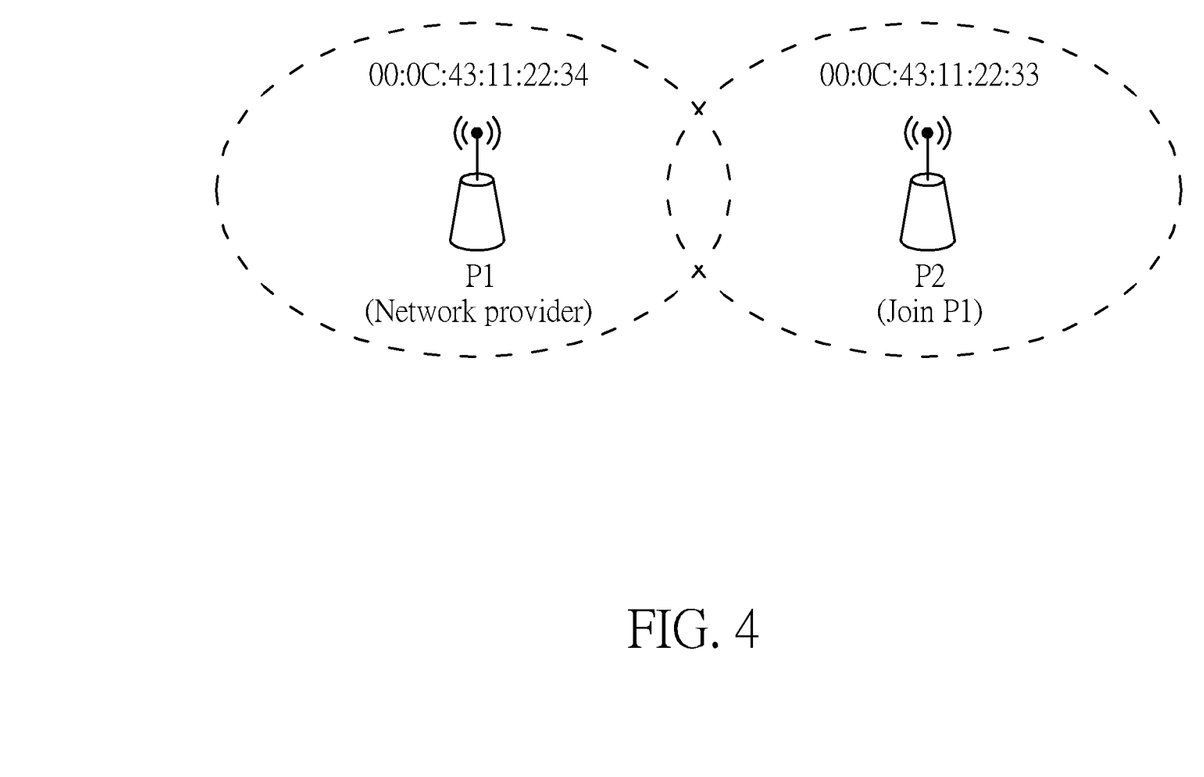

FIG. 4 illustrates an embodiment where there is two wireless APs P1 and P2 boot up at the same time. The wireless APs P1 and P2 may scan around and find the other one since their coverage ranges overlap, and they should negotiate to determine which one is the network provider and which one is the network joiner. In this embodiment, the MAC address of the wireless AP P1 is 00:0C:43:11:22:34, and the MAC address of the wireless AP P2 is 00:0C:43:11:22:33; hence, the wireless AP P2 may act as the network joiner and join the wireless AP P1.

Please note that if multiple wireless APs boot up at the same time where they may negotiate with each other, there should be only one of the wireless APs regarded as the network provider in the negotiation. If multiple wireless APs act as the network providers, the network providers may wait for other network joiners to establish the network connection. Two network providers cannot negotiate with each other to establish the network connection, and thus the entire wireless coverage range may not be realized. If the signal strengths of the wireless APs are similar, the MAC address is applied to determine which one is the network provider. Since every wireless AP has a unique MAC address, the criterion of using the MAC address is a preferable way to determine the only one network provider. In an embodiment, the wireless AP having the highest MAC address may act as the network provider and other wireless APs join it. Those skilled in the art should realize that this embodiment is only one of various implementations of the present invention to determine the network provider. Other possible criteria, such as determining the wireless AP having the lowest MAC address to be the network provider, may also be applied in other embodiments.

Figure 5:
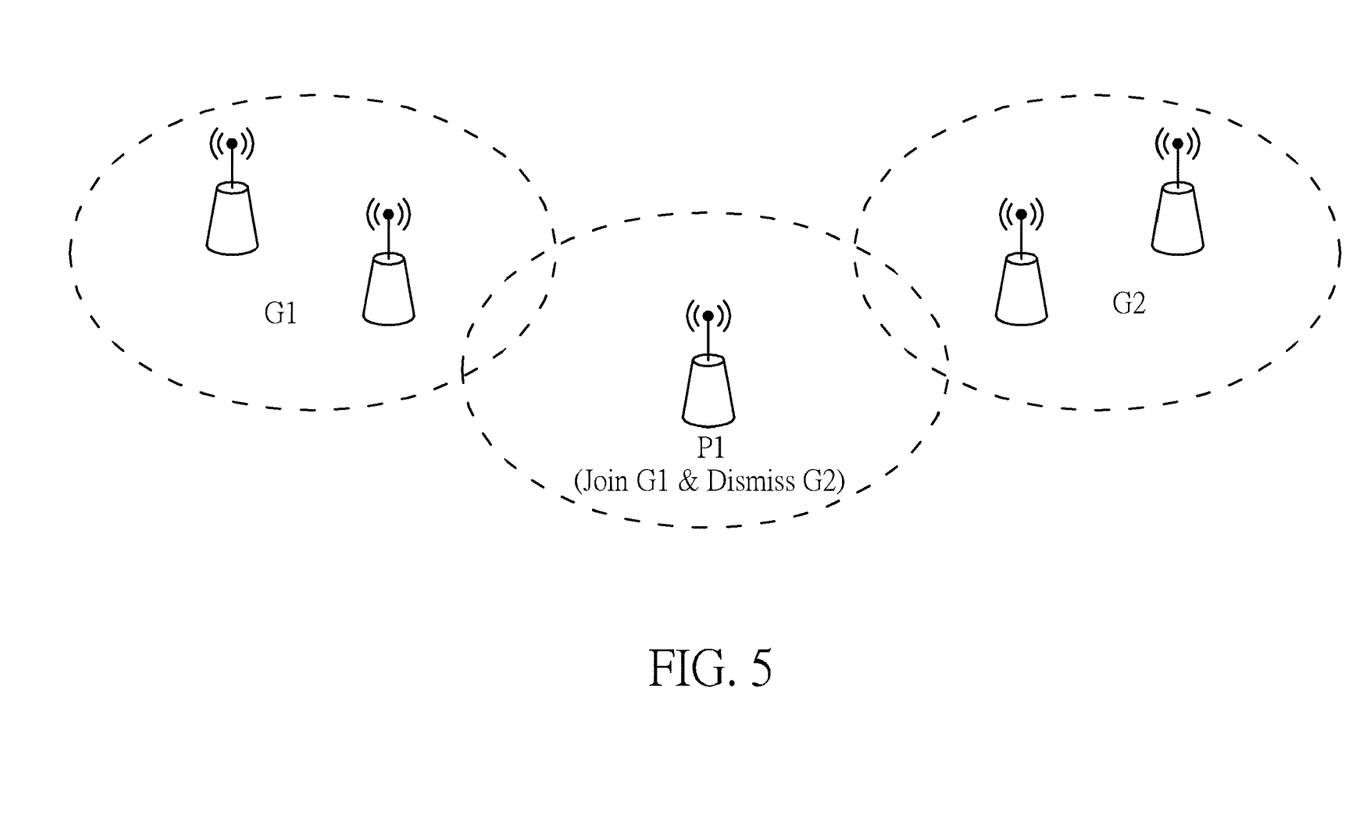

In an embodiment, there may be many wireless APs spread across a larger area. When the wireless APs boot up, each wireless AP may not be directly connected to all of the other wireless APs. In such a situation, a wireless AP may find a nearby wireless AP to establish the network connection. These two wireless APs may be configured to have an identical profile and become a group. After more times of negotiation, other wireless APs are added to the group and configured with the identical profile. Also, another group of wireless APs may be generated in a similar way where the groups are far from each other and the coverage ranges of the groups do not overlap. In such a situation, the profiles of wireless APs in different groups may be different. As shown in FIG. 5, when a wireless AP P1 boots up and the wireless AP P1 discovers a group G1 of wireless APs and a group G2 of wireless APs at the same time, i.e., the coverage range of the wireless AP P1 respectively overlaps the coverage range of the group G1 and the coverage range of the group G2. The wireless AP P1 then selects to join one of the groups G1 and G2 according to a selection rule such as comparison of the MAC address or signal strength as mentioned above. For example, the wireless AP P1 may select to join the group G1 according to the selection rule. Note that the wireless APs in different groups G1 and G2 may have different profiles since the groups G1 and G2 are generated respectively; hence, when the wireless AP P1 selects to join the group G1, the wireless AP P1 may transmit an indication to the group G2 to dismiss the group G2 of wireless APs. The wireless APs originally in the group G2 then join the network connection of the group G1 after the group G2 is dismissed.

In order to prevent a wireless AP from wrongly connecting to another network, a group identifier (ID) is assigned to each wireless AP. A set of wireless APs used in a building may be preconfigured with an identical group ID. More specifically, several wireless APs may be sold in a package and these wireless APs are configured with a group ID identical to each other. Another package of wireless APs may be configured with another group ID. When a user buys a package of wireless APs and boots them up, these wireless APs are preconfigured with the same group ID; hence, these wireless APs may find those having the same group ID to connect. Therefore, the wireless APs may not wrongly connect to a wireless AP in another package, e.g., the wireless AP in neighborhood, when the users in two neighbor buildings simultaneously boot up their wireless AP products.

For example, if a network joiner requests to establish network connection with a network provider, the network provider needs to determine whether the group ID of the network joiner is identical to the group ID of the network provider. Therefore, the network provider may establish the network connection with the network joiner only when the group ID of the network joiner is identical to the group ID of the network provider. On the other hand, if the group ID of the network joiner is different from the group ID of the network provider, the network provider may reject to establish the network connection.

Please note that the wireless APs of the present invention may also be connected to an original wireless AP or wireless networking device in the building. For example, there may be a wireless AP in the building originally, and the user needs to extend the Wi-Fi coverage range in the building and therefore disposes several new wireless APs to be connected to the original wireless networking device. In order to configure the profile of the new added wireless AP to be identical to the original one, a first new wireless AP may be manually configured by using a computer and/or pressing a Wi-Fi protected setup (WPS) push button as the conventional method. After the first new wireless AP is configured successfully, other new wireless AP(s) may be automatically configured to have the same profile according to the method of the present invention. In such a situation, the user may only need to manually configure one wireless AP in the configuration process, which also achieves the convenience and saves time consumption.

Figure 6:
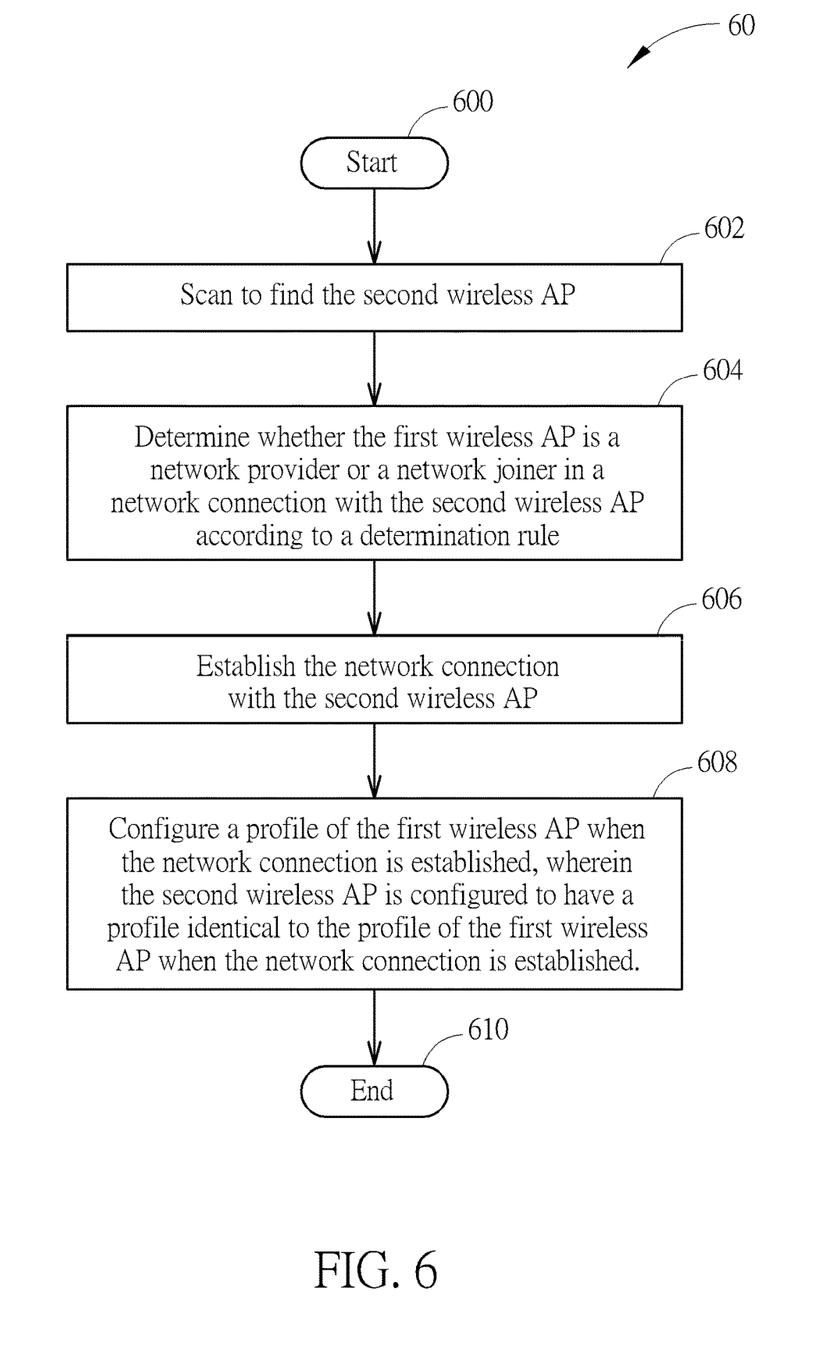
FIG. 6 is a schematic diagram of a network configuration process according to an embodiment of the present invention.

The above operations of two wireless APs booting up at the same time may be summarized into a network configuration process 60, as shown in FIG. 6. The network configuration process 60 may be used in a first wireless AP, which boots up with a second wireless AP at the same time, where the coverage ranges of the first wireless AP and the second wireless AP overlap each other. The network configuration process 60 includes the following steps:

Step 600: Start.

Step 602: Scan to find the second wireless AP.

Step 604: Determine whether the first wireless AP is a network provider or a network joiner in a network connection with the second wireless AP according to a determination rule.

Step 606: Establish the network connection with the second wireless AP.

Step 608: Configure a profile of the first wireless AP when the network connection is established, wherein the second wireless AP is configured to have a profile identical to the profile of the first wireless AP when the network connection is established.

Step 610: End.

Figure 7:
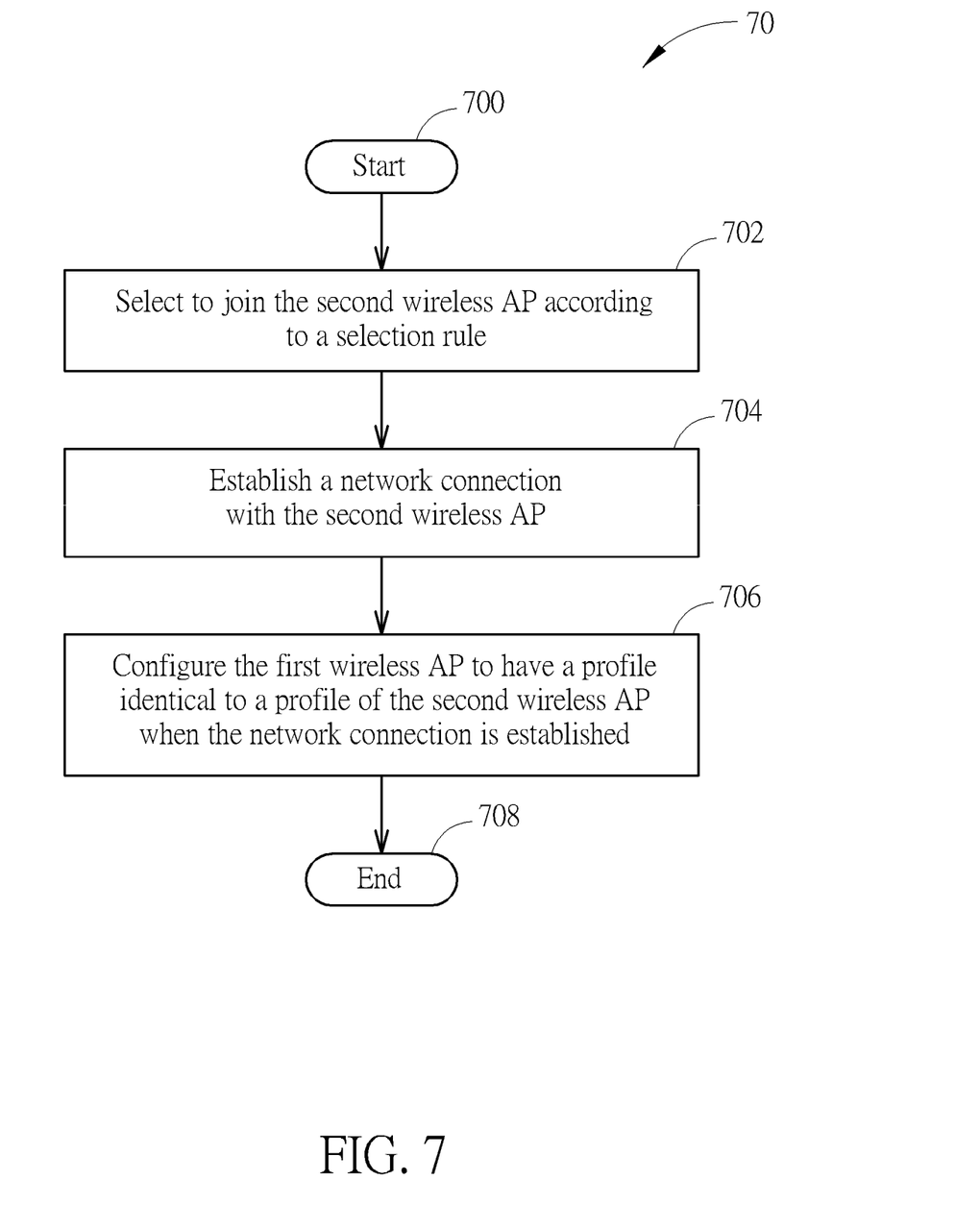
FIG. 7 is a schematic diagram of a network configuration process according to an embodiment of the present invention.

In addition, the above operations of a wireless AP booting up and performing a selection to establish a network connection may be summarized into a network configuration process 70, as shown in FIG. 7. The network configuration process 70 may be used in a first wireless AP, which boots up and discovers a second wireless AP and a third wireless AP at the same time. The network configuration process 70 includes the following steps:

Step 700: Start.

Step 702: Select to join the second wireless AP according to a selection rule.

Step 704: Establish a network connection with the second wireless AP.

Step 706: Configure the first wireless AP to have a profile identical to a profile of the second wireless AP when the network connection is established.

Step 708: End.

The detailed operations of establishing the network connection will be narrated as follows. The process of network establishment and configuration may include a discovery phase and security handshake, where the security handshake includes authentication and association.

Figure 8:
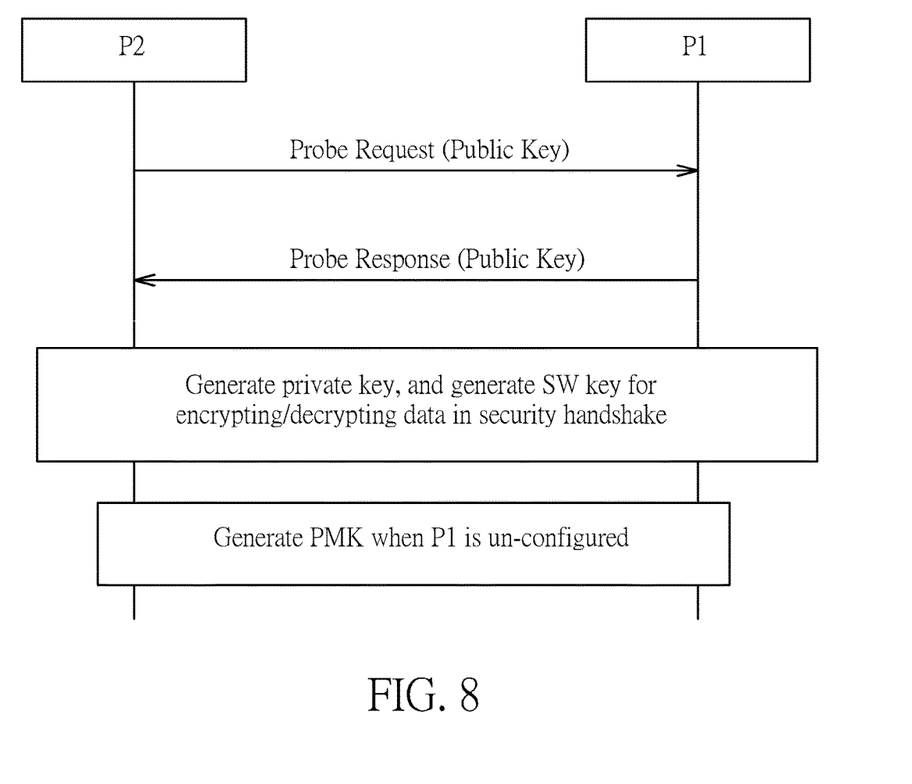
FIG. 8 is a schematic diagram of a discovery phase of the network establishment and configuration according to an embodiment of the present invention.

Please refer to FIG. 8, which is a schematic diagram of a discovery phase of the network establishment and configuration according to an embodiment of the present invention. As shown in FIG. 8, in the discovery phase, a wireless AP P1 may act as a network provider and a wireless AP P2 may act as a network joiner. First of all, the wireless AP P2 may transmit a probe request to the wireless AP P1, where the probe request includes a public key such as a Diffie-Hellman (DH) public key. The wireless AP P1 then responds with a probe response, where the probe response also includes a public key such as the DH public key. Note that the probe request and the probe response are delivered in a unicast manner, which is different from the conventional broadcast probe message. In other words, if a first wireless AP finds out a second wireless AP supporting automatic configuration functions of the present invention, the first wireless AP may transmit a unicast probe request to the second wireless AP and then receive a probe response. The public key may be used for generating a private key and a software (SW) key. Since the wireless APs P1 and P2 exchange the DH public key, they may generate the same DH private key, and also generate the same software key, which is further used for encrypting/decrypting data (e.g., encrypting and decrypting the group ID) in security handshake. If a wireless AP P1 is un-configured, a pairwise master key (PMK) may also be generated in the discovery phase.

After the discovery phase, the wireless APs P1 and P2 may perform authentication and association of the security handshake.

Figure 9:
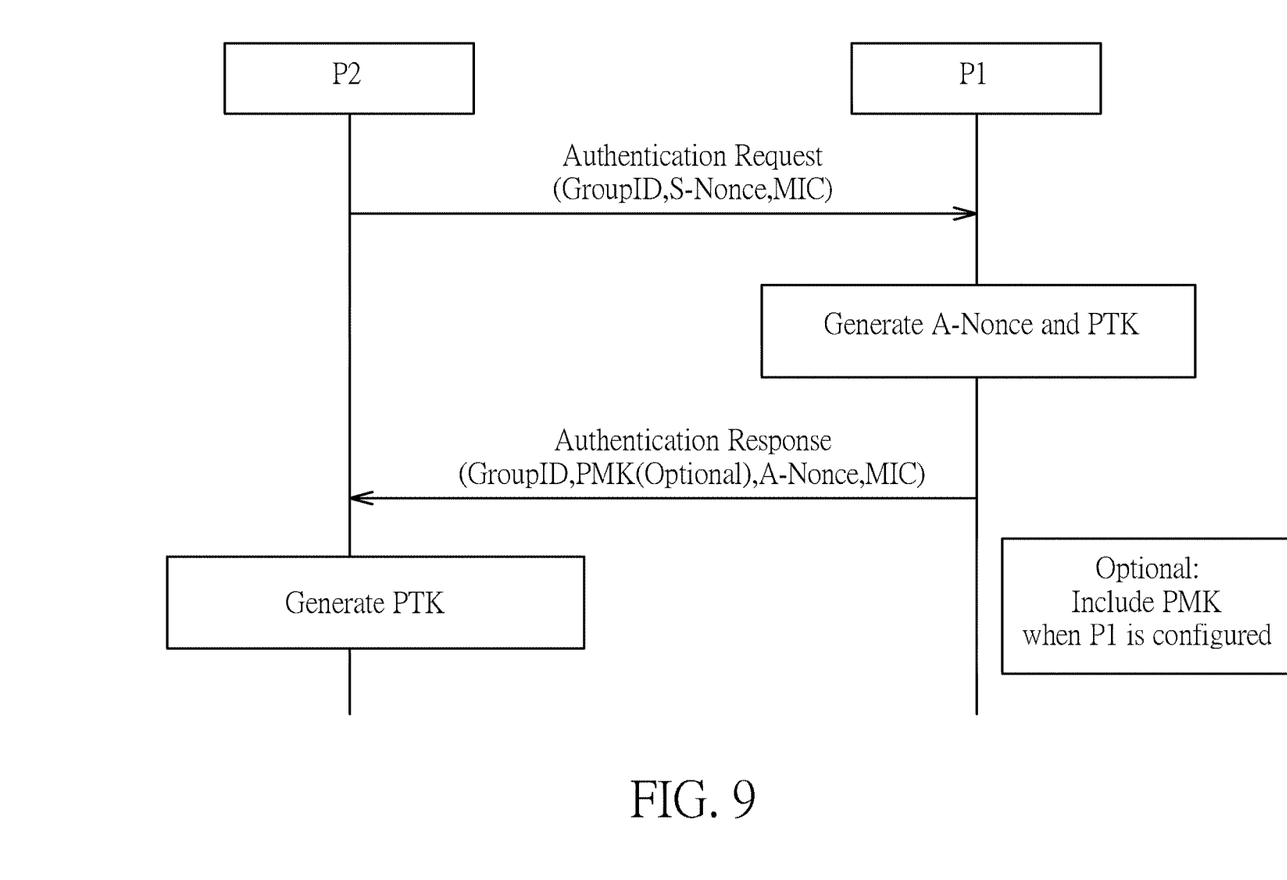
FIG. 9 is a schematic diagram of authentication of security handshake according to an embodiment of the present invention.

Please refer to FIG. 9, which is a schematic diagram of authentication of security handshake according to an embodiment of the present invention. As shown in FIG. 9, the wireless AP P2 may transmit an authentication request to the wireless AP P1, where the authentication request includes, for example, a group ID, a supplicant nonce (S-Nonce) and a message integrity code (MIC). The group ID may be encrypted by the SW key, and is used to ensure that the wireless APs P1 and P2 belong to the same group or package as mentioned above. The S-Nonce is used to generate an authenticator nonce (A-Nonce) and thereby generate a pairwise transient key (PTK). For example, the wireless AP P1 may use the S-Nonce, the A-Nonce, the MAC address of the wireless AP P1, the MAC address of the wireless AP P2, and/or the PMK to calculate the PTK. The MIC allows the wireless AP P1 to verify the key and the encrypted data.

After receiving the authentication request, the wireless AP P1 may verify the MIC, and generate the A-Nonce and PTK according to the received S-Nonce. The wireless AP P1 then transmits an authentication response to the wireless AP P2, where the authentication response includes, for example, the group ID, the A-Nonce and an MIC. The group ID may be encrypted by the SW key, and is used to ensure that the wireless APs P1 and P2 belong to the same group or package as mentioned above. The A-Nonce is used to generate the PTK. For example, the wireless AP P2 may use the previously transmitted S-Nonce, the received A-Nonce, the MAC address of the wireless AP P1, the MAC address of the wireless AP P2, and/or the PMK to calculate the PTK in the same manner. Note that the PMK may be generated in the discovery phase if the network provider (e.g., the wireless AP P1) is un-configured when performing handshake; this implementation applies to a wireless AP just booting up. In another embodiment, the PMK may be encrypted by using the SW key and included in the authentication response to be transmitted to the wireless AP P2 from the wireless AP P1 if the wireless AP P1 has been configured when performing handshake; this implementation applies when the wireless AP P1 has been connected to an external network such as the Internet. The PMK used in the security handshake should follow the previous configuration applied in the wireless AP P1. Therefore, the wireless AP P1 should transmit the PMK in the authentication response and inform the wireless AP P2 to calculate the PTK based on this PMK. Alternatively, as the embodiment shown in FIG. 1, a PMK is generated when the wireless AP P1 establishes a network connection with the wireless AP P2. When the wireless AP P3 joins this network connection, the configured wireless AP P2 should transmit this PMK to the wireless AP P3, allowing the wireless AP P3 to configure its profile to be identical to the profile of the wireless APs P1 and P2.

Figure 10:
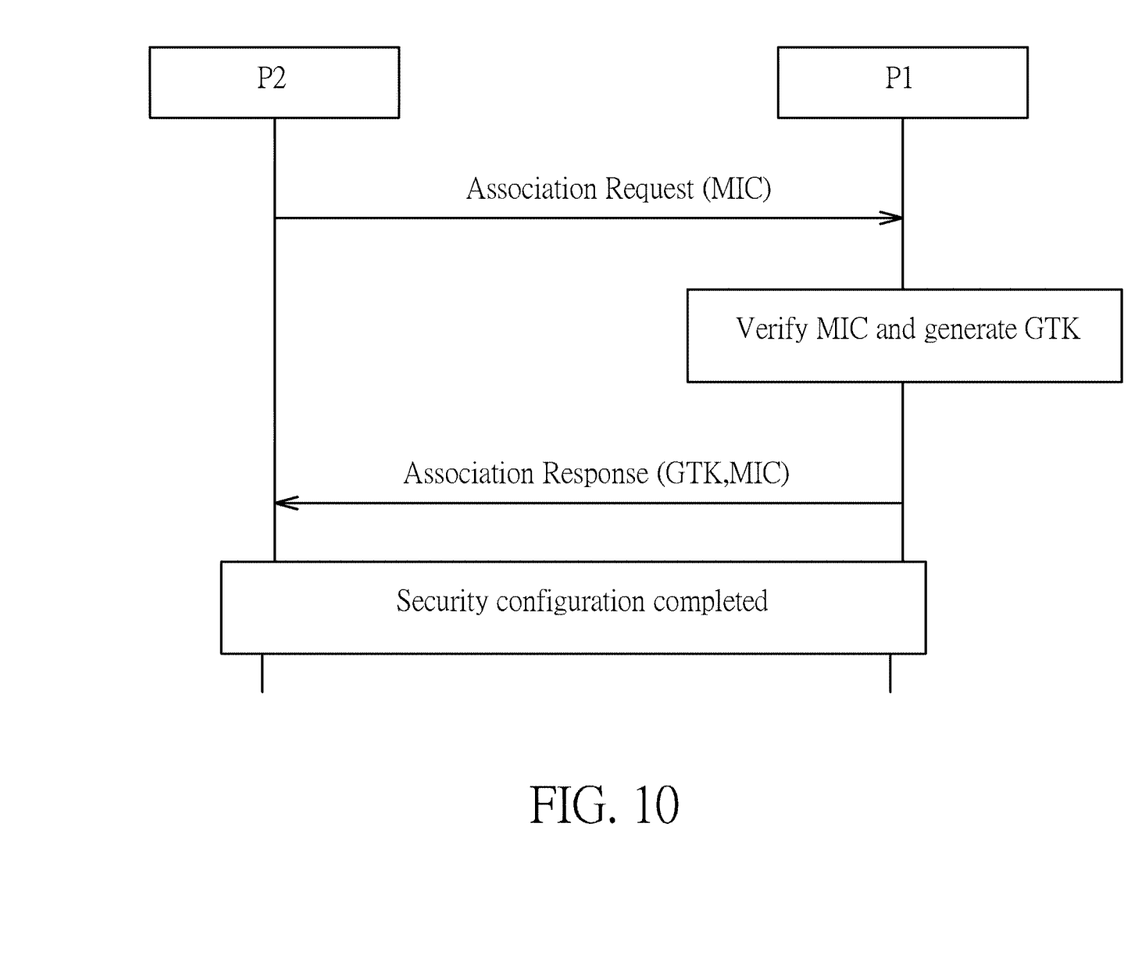
FIG. 10 is a schematic diagram of association of security handshake according to an embodiment of the present invention.

Please refer to FIG. 10, which is a schematic diagram of association of security handshake according to an embodiment of the present invention. As shown in FIG. 10, the wireless AP P2 may transmit an association request to the wireless AP P1, where the association request includes, for example, an MIC. After receiving the association request, the wireless AP P1 may verify the MIC, and generate a group temporal key (GTK). The wireless AP P1 then transmits an association response to the wireless AP P2, where the association response includes, for example, the GTK and an MIC. Therefore, the wireless AP P2 may use the GTK to encrypt data. After the association phase, the security configuration is completed without further performing a 4-way handshake process after association. Note that the security handshake operation may be performed automatically in profile configuration when the network connection is established between two wireless APs. The user may not need to perform the profile configuration manually.

Please note that the present invention aims at providing a method of establishing and configuring a network connection for wireless APs. Those skilled in the art may make modifications and alternations accordingly. For example, the determination rule and the selection rule of the wireless AP may include comparison of the MAC address and signal strength as mentioned above. Those skilled in the art should realize that examples of the determination rule and the selection rule are not limited thereto. A wireless AP may select to establish network connection with any other wireless AP having an identical group ID according to a predetermined selection rule, as long as the predetermined selection rule allows the wireless AP to make a selection under any scenarios.

To sum up, in the present invention, the wireless APs may automatically connect to each other and negotiate to establish the wireless network coverage and perform configuration, where the user does not need to manually configure every wireless AP respectively. According to a predefined determination rule, two wireless APs establishing a network connection may determine their roles as a network provider or a network joiner, to configure their profiles to be identical. According to a selection rule, a wireless AP may select a proper wireless AP to establish a network connection, to configure its profile to be identical to the selected wireless AP. The above rules are adaptive to any scenarios; hence, the wireless APs after configuration may have the same profile. According to the present invention, the time and human activity required for configuring the wireless APs may be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of network configuration for a first wireless access point (AP), the method comprising:
    scanning to find a second wireless AP;

determining whether the first wireless AP is a network provider or a network joiner in a network connection with the second wireless AP according to a determination rule;

establishing the network connection with the second wireless AP;

configuring a profile of the first wireless AP when the network connection is established;

determining whether a group identifier (ID) of the second wireless AP is identical to a group ID of the first wireless AP; and establishing the network connection with the second wireless AP when the group ID of the second wireless AP is identical to the group ID of the first wireless AP, or rejecting to establish the network connection with the second wireless AP when the group ID of the second wireless AP is different from the group ID of the first wireless AP;

wherein the second wireless AP is configured to have a profile identical to the profile of the first wireless AP when the network connection is established.

2. The method of claim 1, further comprising:
configuring, by the first wireless AP, a service set identifier (SSID) of the network connection when the first wireless AP is determined to be the network provider in the network connection.

3. The method of claim 1, further comprising:
scanning to find a third wireless AP after the profile of the first wireless AP is configured; and
adding the third wireless AP in the network connection when a group ID of the third wireless AP is identical to a group ID of the first wireless AP, or rejecting to add the third wireless AP in the network connection when the group ID of the third wireless AP is different from the group ID of the first wireless AP.

4. The method of claim 1, wherein the step of determining whether the first wireless AP is the network provider or the network joiner in the network connection with the second wireless AP according to the determination rule comprises:
determining whether the first wireless AP is the network provider or the network joiner in the network connection with the second wireless AP according to a comparison of a media access control (MAC) address of the first wireless AP and a MAC address of the second wireless AP.

5. The method of claim 1, wherein the step of determining whether the first wireless AP is the network provider or the network joiner in the network connection with the second wireless AP according to the determination rule comprises:
determining that the first wireless AP is the network provider in the network connection with the second wireless AP when the first wireless AP is connected to an external network without via the network connection, or
determining that the first wireless AP is the network joiner in the network connection with the second wireless AP when the second wireless AP is connected to an external network without via the network connection.

6. The method of claim 1, wherein when the first wireless AP and the second wireless AP are configured and the network connection is established, the network connection allows a wireless roaming for a wireless communication device.

7. The method of claim 1, wherein when the first wireless AP is determined to be the network provider in the network connection with the second wireless AP, the step of establishing the network connection with the second wireless AP comprises:
receiving a probe request from the second wireless AP, wherein the probe request comprises a public key;
transmitting a probe response to the second wireless AP, wherein the probe response comprises the public key;
generating a private key and a software key based on the public key; and
generating a pairwise master key (PMK) when the first wireless AP is un-configured.

8. The method of claim 7, wherein the probe request and the probe response are delivered in a unicast manner.

9. The method of claim 7, wherein the step of establishing the network connection with the second wireless AP further comprises:
performing an authentication of a security handshake with the second wireless AP; and
performing an association of the security handshake with the second wireless AP.

10. The method of claim 9, wherein the step of performing the authentication of the security handshake with the second wireless AP comprises:
receiving an authentication request from the second wireless AP, wherein the authentication request comprises at least one of a group ID, a supplicant nonce (S-Nonce) and a first message integrity code (MIC);
verifying the first MIC and generating an authenticator nonce (A-Nonce) and a pairwise transient key (PTK) according to the S-Nonce; and
transmitting an authentication response to the second wireless AP, wherein the authentication response comprises at least one of the group ID, the A-Nonce and a second MIC.

11. The method of claim 10, wherein the authentication response further comprises a PMK when the first wireless AP is configured.

12. The method of claim 9, wherein the step of performing the association of the security handshake with the second wireless AP comprises:
receiving an association request from the second wireless AP, wherein the association request comprises a first MIC;
verifying the first MIC and generating a group temporal key (GTK); and
transmitting an association response to the second wireless AP, wherein the association response comprises at least one of the GTK and a second MIC.

13. A method of network configuration for a first wireless access point (AP), the method comprising:
selecting to join a second wireless AP according to a selection rule;
establishing a network connection with the second wireless AP; and
configuring the first wireless AP to have a profile identical to a profile of the second wireless AP when the network connection is established;
wherein the step of establishing the network connection with the second wireless AP comprises:
transmitting a probe request to the second wireless AP, wherein the probe request comprises a public key;
receiving a probe response from the second wireless AP, wherein the probe response comprises the public key;
generating a private key and a software key based on the public key; and generating a pairwise master key (PMK) when the second wireless AP is un-configured.

14. The method of claim 13, wherein the first wireless AP receives a signal from the second wireless AP and a signal from a third wireless AP at the same time.

15. The method of claim 14, wherein the step of selecting to join the second wireless AP according to the selection rule comprises:
selecting to join the second wireless AP when the strength of the signal from the second wireless AP is greater than the strength of the signal from the third wireless AP.

16. The method of claim 14, wherein the step of selecting to join the second wireless AP according to the selection rule comprises:
selecting to join the second wireless AP when the second wireless AP has a media access control (MAC) address higher than a MAC address of the third wireless AP.

17. The method of claim 13, wherein the step of selecting to join the second wireless AP according to the selection rule comprises:
selecting to join the second wireless AP when the second wireless AP is connected to an external network without via the network connection.

18. The method of claim 13, wherein the first wireless AP discovers a first group of wireless APs and a second group of wireless APs at the same time.

19. The method of claim 18, further comprising:
selecting to join the first group of wireless APs; and
transmitting an indication to the second group of wireless APs to dismiss the second group of wireless APs.

20. The method of claim 19, wherein the wireless APs in the second group join a network connection of the first group of wireless APs after the second group is dismissed.

21. The method of claim 13, wherein when the first wireless AP and the second wireless AP are configured and the network connection is established, the network connection allows a wireless roaming for a wireless communication device.

22. The method of claim 13, wherein the probe request and the probe response are delivered in a unicast manner.

23. The method of claim 13, wherein the step of establishing the network connection with the second wireless AP further comprises:
performing an authentication of a security handshake with the second wireless AP; and
performing an association of the security handshake with the second wireless AP.

24. The method of claim 23, wherein the step of performing the authentication of the security handshake with the second wireless AP comprises:
transmitting an authentication request to the second wireless AP, wherein the authentication request comprises at least one of a group ID, a supplicant nonce (S-Nonce) and a first message integrity code (MIC);
receiving an authentication response from the second wireless AP, wherein the authentication response comprises at least one of the group ID, an authenticator nonce (A-Nonce) and a second MIC; and
generating a pairwise transient key (PTK) according to the A-Nonce.

25. The method of claim 24, wherein the authentication response further comprises a PMK when the second wireless AP is configured.

26. The method of claim 23, wherein the step of performing the association of the security handshake with the second wireless AP comprises:
transmitting an association request to the second wireless AP, wherein the association request comprises a first MIC;
receiving an association response from the second wireless AP, wherein the association response comprises at least one of the GTK and a second MIC.

* * * * *